INVENTOR.
ARTHUR DRITZ
BY
ATTORNEY

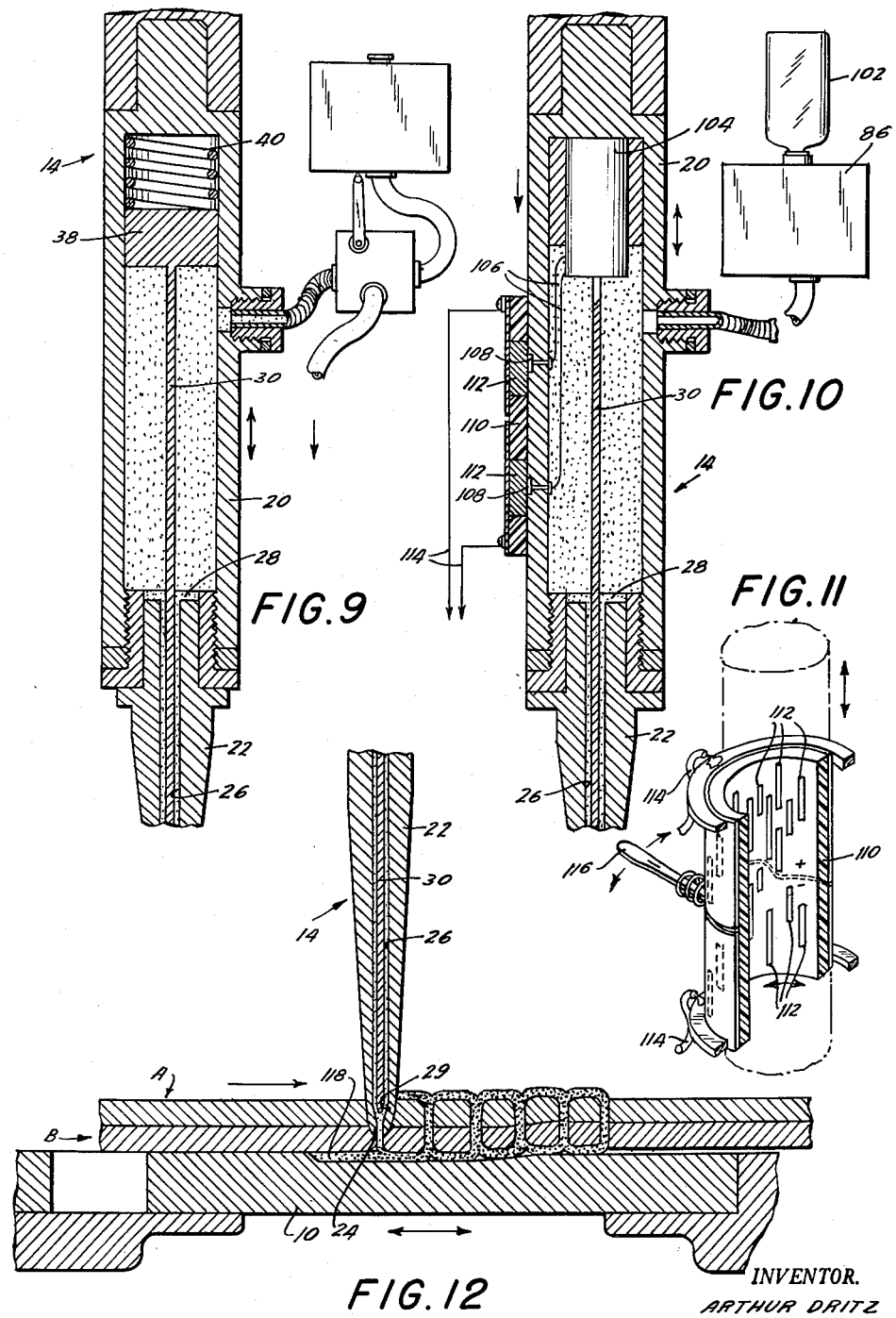

INVENTOR.
ARTHUR DRITZ

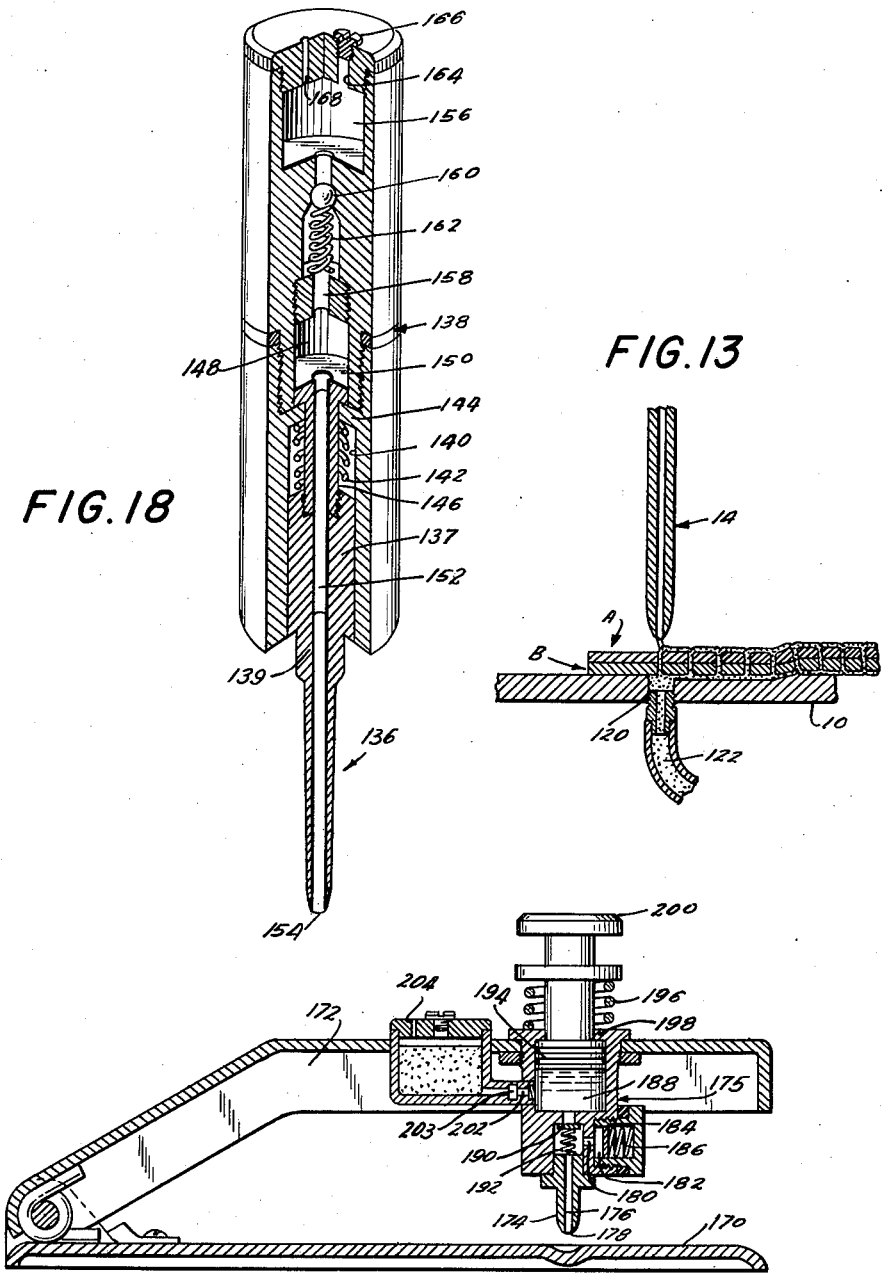

United States Patent Office 3,031,349
Patented Apr. 24, 1962

3,031,349
APPARATUS FOR SECURING TOGETHER SUPERPOSED PLIES OF CLOTH OR PLASTIC SHEETS
Arthur Dritz, 151 Columbia Heights, Brooklyn, N.Y.
Filed Apr. 9, 1957, Ser. No. 651,722
2 Claims. (Cl. 156—513)

The present invention relates to the permanent or semi-permanent attachment of superposed plies of material, in a manner comparable to sewing, stapling or nailing, but using a settable plastic material applied to the plies while in fluid condition. It may be considered in a general way as involving sewing or tacking with a thread or mass of plastic material formed in situ.

Conventional sewing machines involve the use of two individual preformed threads of natural or synthetic material which must be interlocked. One is threaded through the needle eye positioned above the plies to be secured together and is adapted to be caused by that needle to penetrate the plies and then be withdrawn therefrom. The other is wound on a bobbin beneath the plies and is adapted to be interlocked with the loops of the first thread as the machine operates. It is a source of considerable trouble to wind the bobbin, and the necessity for synchronizing the operations of the needle and bobbin makes for appreciable mechanical complexity.

There are many synthetic materials which have physical characteristics such that they are well adapted to function to hold plies of the same or different material together, but in many instances it is not feasible to form them into threads capable of being used in conventional types of sewing machines, or even with hand-manipulated needles.

The prime object of the present invention is to greatly simplify the operation of securing two plies of materials together by using, as the securing medium, a thread or filament or mass of non-fluid plastic material formed in situ on, in, or between the plies while in fluid condition. An element such as a specially designed needle is caused to penetrate the plies and appropriate securing material, in fluid form, passes through that element and is deposited in at least a portion of the penetration space. This material is of a type such as to solidify or "set" after it has escaped from the needle, and when that change of state occurs the plies will be securely bound together. Various types of stitches may be formed in accordance with the present invention, ranging in nature from a "tacking" type which engages the plies merely adjacent their facing surfaces, through a "stapling" type in which the set material extends through both plies and may be headed over at the top and bottom, to a "sewn" type in which continuous loops of set material extend through the plies at spaced points and over the upper and lower surfaces of the ply assembly.

It will therefore be realized that one prime advantage of the present invention is its simplicity and flexibility of use. In its most elementary application all that is required is that the superposed plies be penetrated at the point where they are to be secured together. Through appropriate mechanism the penetration of the plies at that point by the needle element, followed by the withdrawal of that element, is sufficient to obtain attachment of the plies to one another. In more advanced applications a continuous looped "sewing" stitch can be formed without having to use a bobbin, without involving needle threading operations at all, and even through the use of but a single penetrating needle element.

The penetrating element is provided with a passage through which the securing material, while in fluid state, is adapted to flow, that passage communicating at one end with a supply of the securing material and opening to the exterior of the penetrating element where that element is adapted to penetrate the superposed plies, and preferably adjacent the pointed tip thereof. Means are provided for feeding the securing material through the passage to the open end thereof and for controlling its escape from the passage, preferably in accordance with the action of the needle element as it penetrates the plies. The object is to have the securing material, while still in fluid state, escape from the needle while the latter is penetrating the plies so as to be deposited in the hole made by the needle, there to solidify or set so as to hold the plies together. To form continuous or partial loops the needle element is caused to penetrate the plies at a series of spaced points, and as the needle element moves from one point to the next the securing material in fluid form is deposited on the exposed surface of the ply assembly, and preferably both on the upper and lower exposed surfaces thereof. When the securing material hardens, sets, or is otherwise converted to a non-fluid state, it will then form a continuous "thread" or filament which will reliably secure the plies together.

To the accomplishment of the above, and to such other objects as may hereinafter appear, the present invention relates to the structure and arrangement of a device for securing together a plurality of superposed plies of material by means of plastic "threads" formed in situ, as defined in the appended claims, and as described in this specification, in which:

FIG. 9 is a cross sectional view on an enlarged scale of the upper portion of the penetrating element of the machine of FIG. 1, showing the manner in which the pressure on the fluid securing material actuates the valve which controls escape of the securing material from the penetrating element;

FIG. 10 is a view similar to FIG. 9 but illustrating an alternative embodiment in which the valve is actuated by a solenoid;

FIG. 11 is a three-quarter perspective view, broken away, of a portion of the controlling mechanism for the embodiment of FIG. 10;

FIG. 12 is a cross sectional view of a single needle penetrating a pair of superposed plies, in which the bottom part of the "loop thread" is formed by means of a groove in the support for the plies;

FIG. 13 is a view similar to FIG. 12 but showing another way in which a single penetrating needle can be used to form a complete "loop thread";

FIG. 18 is a side elevational view, broken away and cross sectioned, of a hand operated implement according to the present invention; and FIG. 19 is a side elevational view, broken away in cross section, of another type of hand operated implement visually similar to a conventional stapling machine.

The substances which can be used for securing purposes in accordance with the present invention are many and varied. They are characterized by being fluid enough so that their flow can be readily controlled and by being capable of setting or converting to non-fluid state when exposed to ambient conditions. For example, a thermoplastic material such as polyvinyl chloride or polyvinyl acetate may be employed which, when heated, will flow but which, when exposed to room temperature, will lose its plastic property. In many cases this general type of material requires heat in order to remain fluid. Other such materials, and many other plastics, when mixed with a volatile solvent, will be readily flowable even when not heated, but when that solvent evaporates the materials lose their fluid characteristics. Polyvinyl chloride may be dissolved in acetone, latex rubber may be mixed with an alcohol or naphtha solvent, and so on. Polyamide type plastics will convert to non-fluid form upon exposure to air. Some plastic materials will remain fluid until mixed with other specific substances. Polyisobutylene and polyethylene or boronfluoride are typical of such substances. These are but a few of the many possibilities, and the selection of a particular securing material will depend in part upon the physical and chemical characteristics of that material (including its color) and in part on the characteristics of the plies being secured together, whether cloth or plastic sheets, and if the latter, whether their compositions are compatible with those of the securing material.

Likewise the characteristics of the superposed plies to be secured together are subject to wide variation. Cloth plies may be secured together most effectively, the securing material not only forming threads in the holes punched by the penetrating elements but also being absorbed into the body of the cloth around those holes to produce an extremely strong bond combining a cementing action with a "threading" action. With non-porous plies such as plastic sheets "threaded" securement may be achieved and, if the securing material is appropriately chosen, it may integrate or amalgamate with the material of which the plies are formed in order to give an added securing action similar to welding.

For purposes of simplicity in the subsequent discussion the securing material will be generally referred to as such, its set state will be referred to as "solid" or "non-fluid," and the superposed plies to be secured together will be designated A and B, without special mention to their particular composition.

Figure 1:
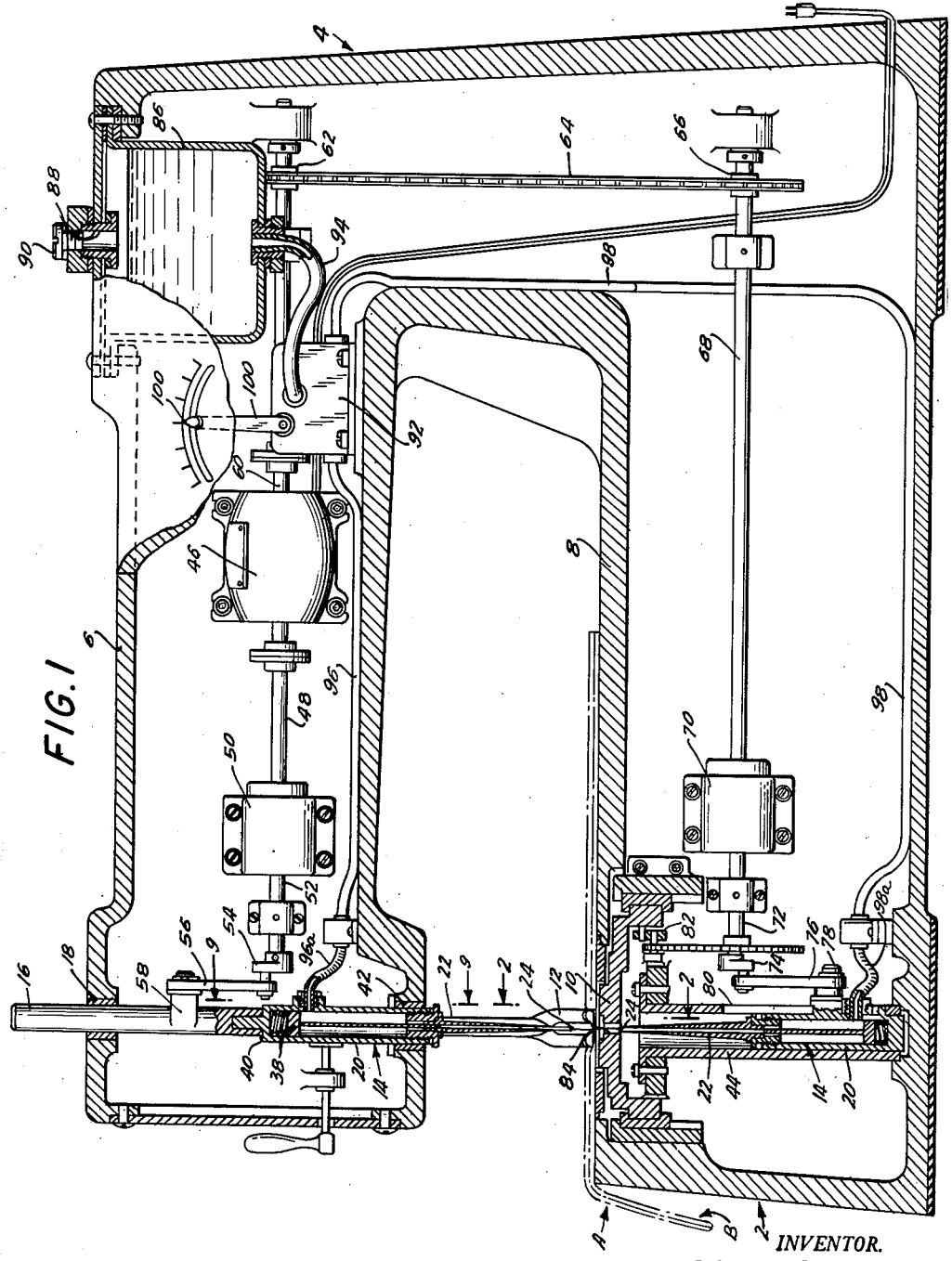
FIG. 1 is a side cross sectional view, partially broken away, of a machine constructed according to the present invention.
Figure 2:
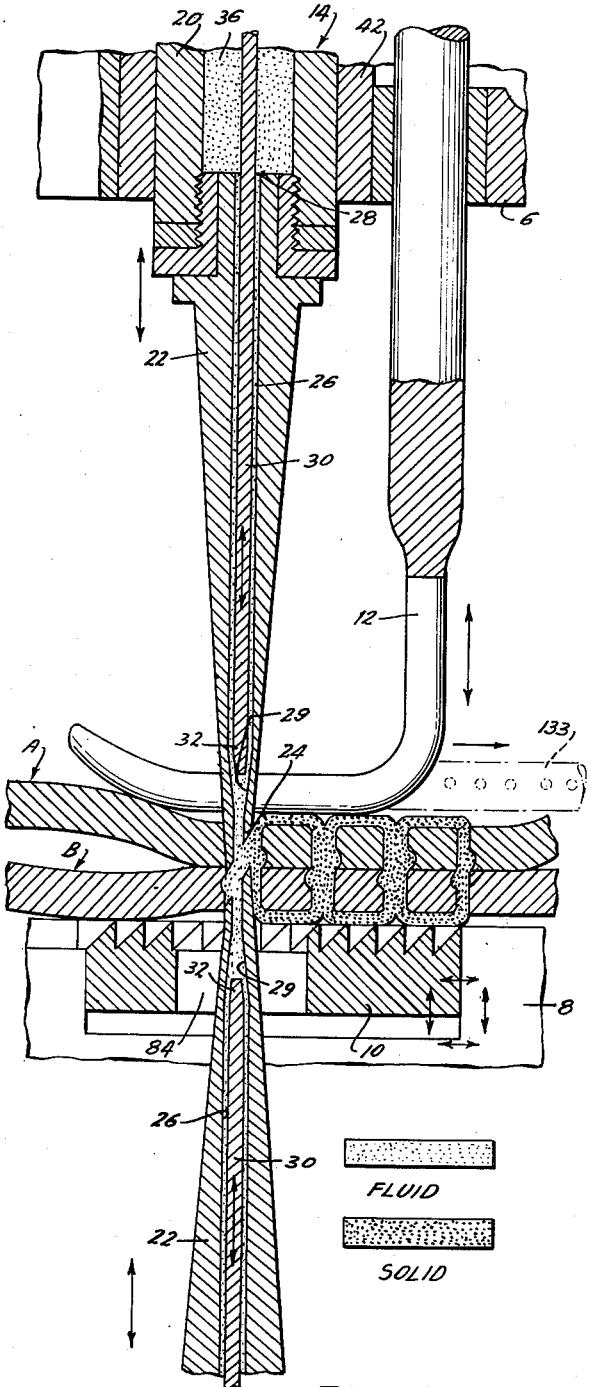
FIG. 2 is a front cross sectional view, on an enlarged scale, showing the penetrating elements of the machine of FIG. 1 approximately in their position of closest proximity, penetrating a pair of superposed plies.

FIGS. 1, 2 and 9 illustrate a simple sewing machine operating according to the present invention. It comprises a hollow base 2, an upright 4 and a hollow arm 6 extending out over the base 2. The superposed plies A and B which are to be secured together are adapted to pass over the upper wall 8 of the base 2 and between a conventional feeding plate 10 and a presser foot 12.

Mounted for reciprocation in the end of the arm 6 is a penetrating element or needle assembly generally designated 14. It comprises an upper rod 16 journaled in bearing 18 and connected to a cylinder 20. Threadedly received in the lower end of the cylinder 20 is a needle 22 having a pointed tip 24, a passage 26 being formed in the needle from the upper end 28 thereof to an opening at the pointed tip 24. The passage 26 is constricted adjacent its lower end, at 29, and a valve stem 30 having a tapered tip 32 is freely received within the passage 26 with appreciable clearance therearound. The stem 30 extends up into the cylinder 20 and is provided with a piston part 38 which is biased downwardly by spring 40 compressed between the part 38 and the upper wall of the cylinder 20. The lower end of the cylinder 20 is journaled for vertical movement in bearing 42 in the lower wall of the arm 6. A similar penetrating element or needle assembly 14 is mounted in the hollow base 2 opposite the previously described assembly 14 and is vertically slidable in tube 44. The presser foot 12 is secured to the upper needle assembly 14 in conventional manner.

A motor 46 is mounted within the arm 6 and is connected by shaft 48 to reduction gearing 50 the output shaft 52 of which rotates crank arm 54, link 56 connecting the crank arm 54 to an arm 58 fixed to the upper rod 16, so that rotation of the motor 46 will cause the upper needle assembly 14 to reciprocate vertically. A second shaft 60 extends from the motor 46 and rotates sprocket wheel 62 which is connected by sprocket chain 64 passing through the upright 4 to sprocket wheel 66 fast on shaft 68 extending through the base 2. The shaft 68 drives reduction gearing 70 the output shaft 72 of which is connected, by means of crank arm 74 and link 76 to arm 78 extending from the lower needle assembly 14 and movable within slot 80 formed in the tube 44, so that the lower needle assembly 14 will be reciprocated in synchronism with the movement of the upper needle assembly 14.

The feeding plate 10 may be of the type common in conventional sewing machines and is adapted to be actuated in conventional manner by gearing generally designated 82 driven by the shaft 72 in order to feed the plies A and B past the needle assemblies 14. An aperture 84 is formed in the plate 10 so that the lower needle 22 can pass therethrough.

A reservoir 86 for the securing material in fluid form is mounted in the arm 6 and a supply of securing material may be poured thereinto through the opening 88 normally closed by screw plug 90. The fluid securing material is adapted to pass from the reservoir 86 into a metering pump 92 via tube 94, the pump being driven by the motor shaft 60 and having outlet pipes 96 and 98 communicating with the cylinders 20 for the upper and lower needle assemblies 14 respectively, the end portions 96a and 98a of these pipes being flexible so as not to inhibit reciprocation of the needle assemblies 14. A manual control 100 accessible from the exterior of the arm 6 may be provided so as to determine the amount of fluid securing material fed to each of the needle assemblies 14 or the duration of the pressure feed of the securing material on each cycle of operation of the machine.

The springs 40 bias the valve stems 30 outwardly so as to close off the lower ends of the passages 26, thus normally preventing escape of the fluid securing material therefrom. However, when the pump 92 forces securing material therefrom into the cylinders 20 the pressure developed in those cylinders will exceed the biasing force of the springs 40 and will cause the pistons 38 to rise, thus lifting the valve stems 30 and opening the lower ends of the passages 26, permitting fluid to escape therefrom under pressure.

As the needle assemblies 14 are reciprocated vertically they will alternately penetrate and be pulled out from the plies A and B. The needles are shown in FIG. 2 approximately in their position of maximum penetration, each of the needles penetrating one of the plies A and B and the tips of the needles meeting substantially at the interface between the plies. It will be noted that each of the needles is provided with a slanted tip, the two slants mating so that the very ends of the needles can, if desired, overlap. The action of the pump 72 is so synchronized with the movement of the needles 14 as to control and time the escape of the fluid securing material.

Figure 3:
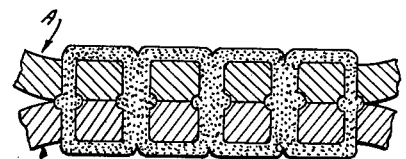
FIGS. 3, 4, 5, 6, 7 and 8 illustrate different types of "stitches" which can be formed by the machine of FIGS. 1 and 2.

In forming the stitch specifically disclosed in FIGS. 2 and 3 escape of the fluid may be substantially continuous. When the needles penetrate the plies A and B fluid is forced out therefrom to fill the holes made in the plies by the needles, the needles are then withdrawn from the plies, fluid escaping from the needles to the upper and lower surfaces of the upper and lower plies respectively, the plies are moved by the plate 10 while the needles are withdrawn, fluid escaping from the needles to define lines on the exposed surfaces of the ply assemblies, the needles then penetrating the plies again at the next point of penetration, and so on. As a result a continuous looped "stitch" is produced, the fluid which escapes from the two needles coalescing while in fluid form to produce the continuity. After the fluid securing material has escaped from the needles it will, after a short period of time, convert to a non-fluid state, thus producing in situ a filament or thread which will "sew" the plies A and B together. In order to distinguish the fluid from the non-fluid or solid states in the drawings, the fluid states are light and the non-fluid or solid states are dark.

The pressure exerted on the fluid securing material which escapes from the needles will play a significant part in the resultant strength of the securement of the plies A and B. The greater the pressure, the thicker will be the securing "thread," even within the plies A and B, since that pressure can cause a dilation of the holes punched in the plies by the needles. Moreover, the pressure will determine the extent to which the fluid material will penetrate the plies laterally of the punched holes where the plies are porous or absorbent, and even where the plies are not porous or absorbent the pressure will tend to penetrate between the plies, as is indicated schematically by the bulbous areas in FIGS. 2–8 adjacent the interface between the plies A and B.

Although it has been stated that in forming the stitch of FIGS. 2 and 3 the fluid securing material escapes substantially continuously from the needles, that is not essential. Intermittent escape of fluid is possible provided that all of the desired areas are covered by fluid, since for so long as the material remains substantially in its fluid state independently deposited and abutting sections or strips of fluid material will coalesce.

Figure 4:
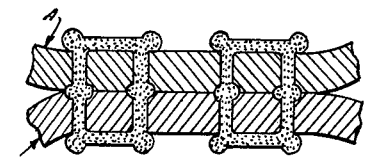
Figure 5:
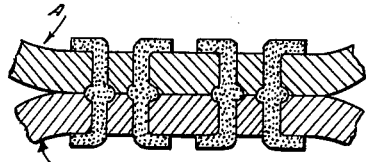
Figure 6:
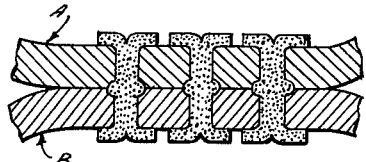
Figure 7:
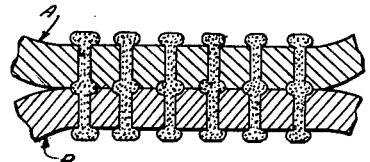
Figure 8:
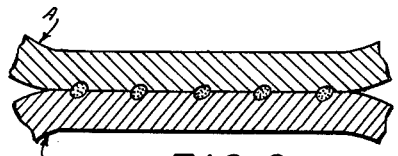

FIGS. 3–8 illustrate variations in the type of "stitch" or securement which may be achieved with the machine of FIGS. 1 and 2 through appropriate control of the pressure exerted on the fluid within the cylinders 20, as by manipulation of the manual control 100. In FIG. 8 fluid is expelled from the needles substantially only while they are at their closest point of approach, so that in effect the plies A and B are spot-glued together. In FIG. 7 escape of fluid stops substantially when the needles are removed from the plies, but with small heads preferably being formed on the exposed surfaces of the ply assemblies. In FIG. 6 escape of fluid commences somewhat sooner and ends somewhat later than with FIG. 7. In FIG. 5 for one stitch escape of the securing material starts sooner than in FIG. 7 and for the next stitch it ends later. In FIG. 4 a pair of penetrations are linked to form a continuous loop, but the next pair of penetrations forms an independent loop. Other variations will undoubtedly suggest themselves.

Instead of relying upon the pressure exerted by the securing fluid to control the escape of the fluid from the needles, the arrangement of FIGS. 10 and 11 may be employed. There the securing fluid is fed from the reservoir 86 under substantially continuous pressure such as might be derived from a compressed air cylinder 102. The valve stem 30 is biased downwardly in any appropriate manner and is adapted to be lifted through actuation of a solenoid 104, the leads 106 from the solenoid going to brushes 108 mounted in the side wall of the cylinder 20 and exposed on the outer surface thereof. An external curved index plate 110 of insulating material is mounted on the arm 6 in any appropriate manner so as to be vertically fixed, the plate 110 having contact areas 112 on the inner surface thereof connected respectively to leads 114 from an appropriate source of electricity. The contact plate 110 is so positioned that as the cylinder 20 reciprocates with the needle assembly 14 the brushes 108 will slide over the inner surface of the plate 110 so as to engage and slide over selected contact areas 112. The length of the contact areas 112 will therefore determine the time during which the solenoid 104 is energized, and hence the time during which fluid can escape from the needles. The index plate 110 is adjustably rotatably mounted, as through manipulation of handle 116, so that the contact areas 112 corresponding to a desired type of stitch can be made operative by being moved into line with the brushes 108.

In FIGS. 1 and 2 a pair of synchronized needle assemblies 14 are employed, both of which penetrate the plies to be secured together in order to produce a continuous "stitch." FIG. 12 illustrates one manner in which a continuous loop "stitch" may be formed by a single needle assembly 14. The plies A and B pass over the feeding plate 10, as before, and that feeding plate is provided, beneath the needle assembly 14, with a groove or trough 118 in its upper surface extending therealong in the direction of movement of the plies A and B so as to pass beneath the needle assembly 14, and preferably extending in opposite directions from a point directly beneath the needle assembly 14. The needle 14 is adapted to completely penetrate both plies A and B and to fill the trough 118 with fluid securing material, and particularly including that portion of the trough 118 extending to the left as viewed in FIG. 12. The trough 118 will therefore cause the formation, on the undersurface of the lower ply B, of a "thread" or strip of securing material which will coalesce with the fluid securing material escaping from the needle each time that the needle penetrates the plies.

An alternative arrangement for the same purpose is disclosed in FIG. 13. There the feeding plate 10 is provided with an aperture 120 immediately beneath the upper needle assembly 14, and a pipe 122 extending from a source of fluid securing material permits a continuous or intermittent flow, as desired, of fluid securing material to the undersurface of the lower ply B as the plies move beneath the needle 14, thus producing a "thread" or strip on that undersurface which coalesces with the "thread" formed by the needle 14 as it successively penetrates the plies at spaced points therealong. The plate 10 and aperture 120 may be considered the equivalent of a needle assembly at the lower surface of the plies which, however, does not penetrate the plies.

Figures 14, 15, 16, 17:
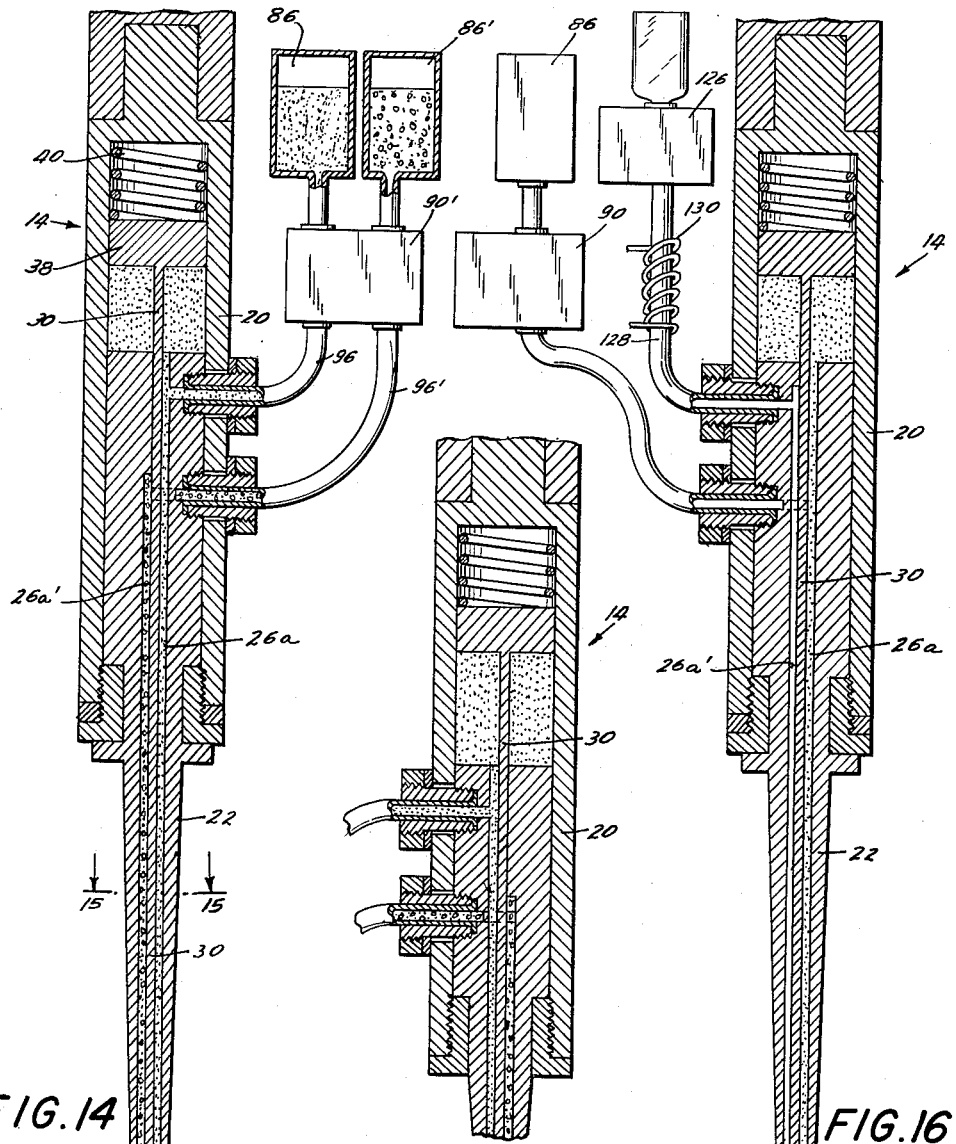
FIG. 14 is a cross sectional view, on an enlarged scale, of a penetrating element adapted to be used in conjunction with two securing materials of a type which will remain fluid until mixed.
FIG. 15 is a cross sectional view taken along the line 15—15 of FIG. 14.
FIG. 16 is a view similar to FIG. 14 but showing the use of heated air passing through the penetrating element in order to control the temperature of the securing material passing therethrough.
FIG. 17 is a view similar to FIG. 14 but showing the use of an electrical heating element in the penetrating element.

FIG. 14 discloses a modified form of needle assembly adapted to be used in conjunction with that type of material which remains fluid until mixed with a second material. Separate reservoirs 86, 86' are provided for the two materials, each of which are fed by pump 90' through individual tubes 96, 96' to separate passages 26a, 26a' extending down through the length of the needle 22 and separated by a bore 124 within which the valve stem 30 is slidable. Because of the presence of the valve stem 30 the two materials are separated from one another until they reach the tip of the needle 22, where they mix just prior to escaping from the needle. In the embodiment of FIGS. 14 and 15 it is the pressure of the material in the passage 26a which controls the actuation of the valve stem 30, but this is purely by way of exemplification.

When thermoplastic securing materials such as polyvinyl chloride or polyvinyl acetate are employed it is necessary or desirable that they be retained at an elevated temperature in order to be sufficiently flowable to function with the apparatus of the present invention. FIG. 16 illustrates one arrangement which may be used to accomplish this end. The needle assembly 14 is the same as in FIG. 14, with the passages 26a and 26a' separated by the stem 30. The thermoplastic substance is fed from reservoir 86 through pump 90 to the passage 26a. Air is fed from any suitable source 126 through pipe 128 to the passage 26a', and a heating coil 130 may be provided around the pipe 128 to heat the air. As a result the thermoplastic substance in the passage 26a will be retained at an elevated temperature until it leaves the needle 22. In FIG. 17 an alternative arrangement is disclosed in which an electrically heated element 132 is bodily incorporated into the needle 22 so as to maintain the needle and its contents at an elevated temperature.

In some instances heat will accelerate the conversion of the securing substance from its fluid to its non-fluid state, either by direct action on that substance or by accelerating evaporation of the solvent therefor. In these instances the heating element 132 may be provided just at the tip of the needle 22 so that the securing material, when it emerges from the needle 22, will be at an elevated temperature. Alternatively or in addition, and as shown in broken lines in FIG. 2, an electrically heated extension 133 may be incorporated into the presser foot 12 and may extend at an appreciable distance from the needle or needles 22 in the direction in which the plies A and B move as they are successively penetrated by the needles, so that the extension 133 will apply heat to the securing material deposited by the needles as the "sewing" operation takes place. The presser foot extension 133, whether or not heated, will also serve to retain the plies A and B together until the securing material converts to solid state.

FIG. 18 discloses a simple pencil-like hand operated implement which is well adapted for the "tacking" together of a pair of superposed plies. It comprises a needle portion 136 and a housing 138 to which the needle 136 is secured. The needle 136, designed to penetrate the plies, is mounted on a movable member 137 a portion 139 of which extends from the housing 138. The movable member 137 is slidably received within a vertical opening 140 in the housing 138 and is urged downwardly by means of spring 142 compressed between the member 137 and a constricted portion 144 of the opening 140. A stem 146 extends up from the element 137 and projects into a chamber 148 in the housing part 138, there being provided with an enlarged head 150 to limit the degree to which the movable member 137, and with it the needle 136, may be moved downwardly. A spring 142 is received around the stem 146 and biases the movable member 137 downwardly. The needle 136 is provided with a passage 152 communicating between the chamber 148 and the needle tip 154. The chamber 148 communicates with a reservoir chamber 156 in the housing 138 via passage 158, a one-way ball valve 160, biased by spring 162, being interposed in the passage 158 so as to permit fluid flow only from the reservoir chamber 156 to the chamber 148. A supply of securing fluid may be poured into the reservoir chamber 156 through the opening 164, normally closed by the threaded plug 166, and an air vent 168 may be provided if desired. After a supply of securing fluid has been placed within the reservoir chamber 156 and fills the chamber 148 and the passage 152, the implement may be grasped by the housing 138 and pressed down onto the plies to be connected together so that the needle 136 penetrates those plies. In penetration the needle 136 will telescope the member 137 upwardly within the housing 138, its enlarged head 150 will move upwardly within the chamber 148, and will function as a piston or pressure member forcing the securing material out from the passage 152 through the needle tip 154. The valve 160 will prevent flow of the securing material to the reservoir chamber 156. When the needle 136 is withdrawn from the plies the spring 142 acting upon the member 137 will cause it to telescope outwardly with respect to the housing 138, the enlarged head 150 will move downwardly within the chamber 148, and a new charge of securing material will be sucked into the chamber 158, the ball valve 160 unseating to permit such flow, the needle 136 being returned to retracted position. The implement will then be ready for another similar manipulation. The type of "stitch" produced by this implement will be similar to those of FIGS. 7 or 8, depending upon the amount of securing material expelled from the needle 136 and the degree to which that needle is caused to penetrate the plies.

FIG. 19 discloses another hand operated implement which is similar in appearance to a conventional stapling machine. It comprises a base 170 to which an arm 172 is pivotally attached, the arm 172 being spring urged upwardly. While the arm 172 could comprise an implement similar to that disclosed in FIG. 18, as here specifically disclosed it operates in a manner similar to that of FIG. 18 but with the addition thereto of means providing for expulsion of securing material over an appreciably longer period of time than is normally possible with the implement of FIG. 18. The penetrating needle 174 is fixedly mounted on a housing 175 and has a passage 176 therein open at the needle tip 178 and communicating with passage 180.

The right hand end of the passage 180 communicates with accumulator chamber 182 having a movable wall 184 biased to the left by means of spring 186. The passage 176 also communicates with chamber 188 via one-way valve 190 biased to the left by means of spring 192 so as to permit fluid flow only from chamber 188 into passage 180. A plunger or pressure-member 194 is slidable within chamber 188, is spring urged upwardly by means of spring 196, its degree of upward movement being limited by engagement with neck 198, and is provided with a movable member extending from the housing 175 and defined by handle 200 extending up from the arm 172. The chamber 188 communicates with any suitable reservoir 204 of securing material via passage 202 which, like passage 158 in FIG. 18, is provided with a one-way valve 203 permitting fluid flow only into the chamber 188.

When "tacking" or "stapling" is to occur the arm 172 is moved downwardly by means of the handle 200. When the needle tip 178 engages the upper surface of the plies to be secured together, the spring 196 will be compressed, the plunger 194 will move downwardly through the chamber 188, and a charge of securing material will be forced into the accumulator chamber 182, the wall 184 moving to the right and compressing the spring 186. Further downward pressure on the handle 200 will cause the needle 174 to penetrate the plies. Because of the action in the accumulator chamber 182, together with the action of the one-way valve 190, securing fluid will be expelled from the needle 174 for an appreciable period of time after the plunger 194 has moved down through the chamber 188, and even after the handle 200 has been released and the plunger 194 has moved back up to its position shown in FIG. 19. Accordingly, with this device "stitches" of the type shown in FIGS. 6 and 7 will result.

It will be seen from the above that with relatively simple mechanism plies of material of many different types may be secured together by means of plastic "theads" or filaments formed in situ from a supply of fluid material which converts to a non-fluid state after it has been applied to the plies, and that the securing action is accomplished through the formation either of continuous or discontinuous plastic "threads" or masses. The tensile strength of those "threads" may play an appreciable part in securing the plies together, and the penetration of the plies by the "threads" or the amalgamation of the "thread" material with the plies will also play an appreciable part in providing for exceptional securing strength. Hence, while the terms "sewing" and "stitching" may be applied to the operations here described, by analogy to the use of preformed threads, the terms "adhering" and "welding" are also applicable.

While but a limited number of embodiments of the present invention have been here disclosed, it will be apparent that many variations may be made therein, all within the scope of the present invention as defined in the following claims.

I claim:

1. A device for securing together a plurality of superposed plies of material comprising a housing containing a reservoir adapted to receive synthetic resinous fluid convertible to non-fluid state, an element for penetrating said plies mounted on said housing and having a penetrating tip with an opening therethrough, fluid communication means between said reservoir and said opening including a chamber in said housing connected to said reservoir via a valve permitting flow only from said reservoir to said chamber, a member extending from said housing for movement relative thereto between a first extended position and a second relatively retracted position, means operatively connected to said member for biasing it toward its first position, and a pressure member movable in said chamber and operatively connected to said extending member for movement therewith so as to force fluid out of said chamber, through said fluid communication means and out of the opening of the penetrating element when said extending member moves from first to second position.

2. The device of claim 1, in which said housing is mounted on a movable support for movement therewith toward and away from said plies, said ply-penetrating element is independent of said chamber and pressure member, and said housing has an accumulator chamber in operative fluid connection with said first mentioned chamber and comprises a movable wall spring biased toward said first mentioned chamber.

References Cited in the file of this patent

UNITED STATES PATENTS

| | | |
|---|---|---|
| 1,978,620 | Brewster | Oct. 30, 1934 |
| 2,466,293 | Alcamo | Apr. 5, 1949 |
| 2,557,668 | Lincoln | June 19, 1951 |
| 2,582,854 | Smith | Jan. 15, 1952 |
| 2,616,482 | Barnes | Nov. 4, 1952 |
| 2,619,031 | Rothenborg | Nov. 25, 1952 |
| 2,713,016 | Weiss | July 12, 1955 |
| 2,778,530 | Sillars | Jan. 22, 1957 |